Nov. 17, 1970     MASARU AOKI     3,540,153
TOY VEHICLE AND TRACK ASSEMBLY
Filed Dec. 27, 1967     5 Sheets-Sheet 1
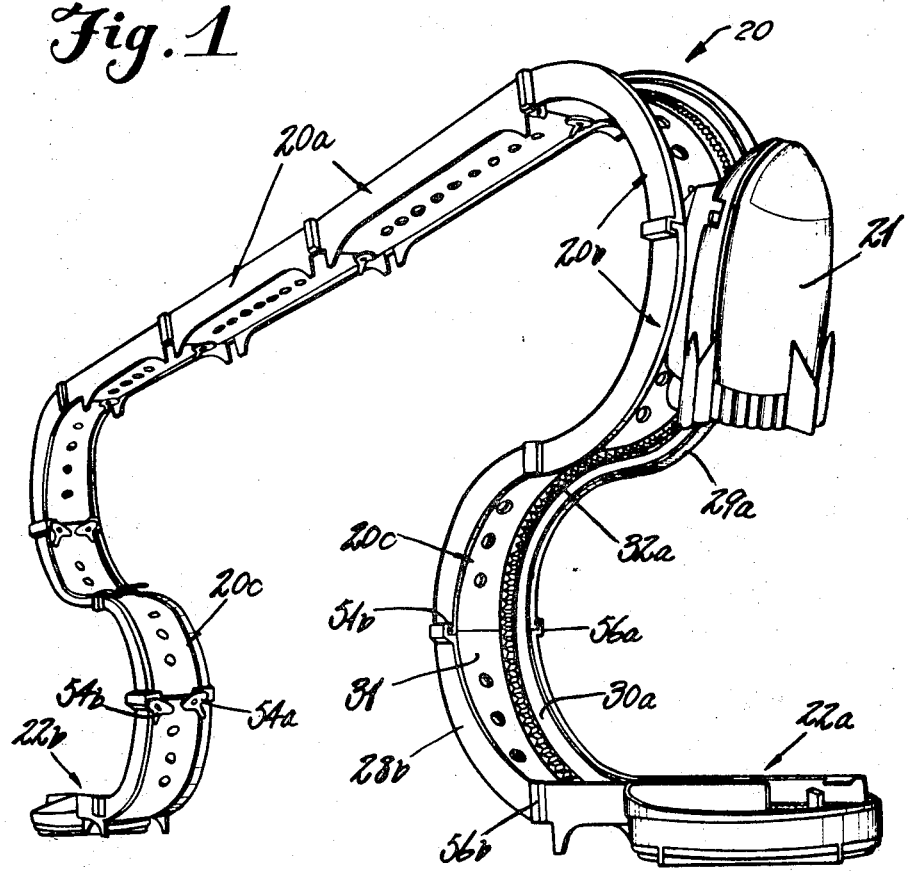
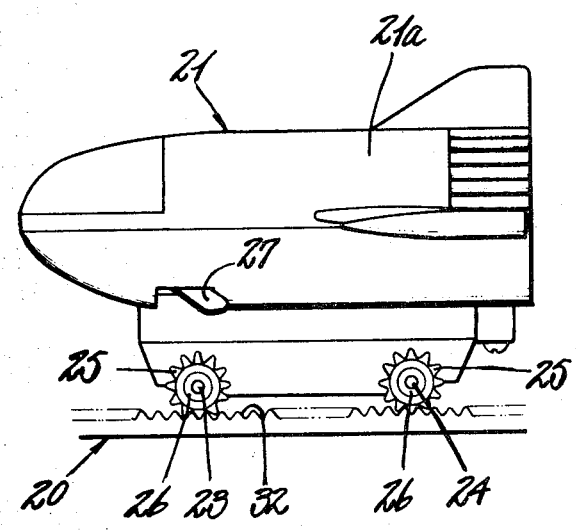
INVENTOR.
MASARU AOKI
ATTORNEYS Nov. 17, 1970 MASARU AOKI 3,540,153
TOY VEHICLE AND TRACK ASSEMBLY
Filed Dec. 27, 1967 5 Sheets-Sheet 2

INVENTOR
MASARU AOKI
BY *McGlew and Toren*
Attorney

Nov. 17, 1970  MASARU AOKI  3,540,153
TOY VEHICLE AND TRACK ASSEMBLY
Filed Dec. 27, 1967  5 Sheets-Sheet 4

INVENTOR.
MASARU AOKI

United States Patent Office 3,540,153
Patented Nov. 17, 1970

3,540,153
TOY VEHICLE AND TRACK ASSEMBLY
Masaru Aoki, 10, 9, 7-chome, Tateishi, Katsushika-ku,
Tokyo, Japan
Filed Dec. 27, 1967, Ser. No. 693,883
Claims priority, application Japan, June 24, 1967,
42/54,102
Int. Cl. A63h 33/26
U.S. Cl. 46—243    11 Claims

ABSTRACT OF THE DISCLOSURE

A toy assembly comprises a vehicle having four toothed wheels and a guide wheel associated with each of the toothed wheels and a plurality of separate straight and curved track sections interconnected to form a bridge-like track structure over which the vehicle can travel in an upright or inverted position. Each track section has a pair of parallel toothed rails and connecting means at each end for interconnecting the track sections together. Further, the track sections have grooves formed in their sides which receive the guide wheels on the vehicle and hold the vehicle on the track even though it is in an inverted position. A turntable arrangement is positioned at each end of the track for reversing the vehicle so that it can run back and forth along the track.

The present invention relates to a toy assembly of the type comprising, in combination, a vehicle adapted to run on a pair of parallel rails, and more particularly, it is concerned with a novel arrangement of toy comprising individul track sections each being provided with a pair of parallel rails and adapted to be coupled to each other to form a continuous track extending between two spaced terminals with the intermediate sections being located in the space above a surface, such as a floor on which terminals are placed, and the present invention also relates to a vehicle adapted to run on the rails without becoming detached from the track irrespective of the positions which the vehicle assumes as it travels on the track.

It is an object of the present invention to provide a railway assembly consisting of a plurality of individual straight track sections and curved track sections which can be connected to each other to form a continuous track extending between the spaced terminals each provided with a turntable placed on the surface, the track containing not only horizontally extending straight courses located near the surface but also vertically curved courses extending upwardly or in the inverted position, the space above the surface relative to the horizontally extending lower straight courses, so that the coupled track sections extending from the terminals form a bridge-form track in the space above the surface, and also to provide a novel means for connecting indivdual track sections.

Another object of the present invention is to provide a novel toy assembly comprising a vehicle which travels on a pair of parallel rails of a continuous track which is formed by connecting individual track sections together so as to extend, in a bridge-form structure, in the space between two terminal turntable members, with the intermediate sections thereof including straight horizontal courses located nearer to the surface on which the terminal members are placed, vertically curved courses and an adjacent straight, horizontal bridge-form course both of the latter courses being located in the space above the first mentioned straight horizontal courses.

Still another object of the present invention is to provide a toy vehicle which is adapted to travel on the parallel rails provided on the assembled continuous track mentioned above, and also to provide a vehicle which never slips or falls off while traveling on the track, and, further, to provide a novel track which is adapted for guiding and retaining the vehicle.

A further object of the present invention is to provide a series of connectable individual track section each having longitudinally extending bilateral grooves adapted to receive the free ends of the shafts of the wheels of the vehicle and to guide the ends of the shafts. Each of these individual track sections is formed with a substantially channel-shaped cross section. Each of the track sections has a flat bottom section located between the bilateral grooves, the upper face of the bottom wall of the track sections which form the track has a pair of longitudinally extending parallel rows of vertical teeth which mesh with the teeth on the toothed wheels provided near the free ends of the shafts of the wheels of the vehicle, the free ends of the shafts are received in the grooves throughout the travel of the vehicle on the assembled track.

As the toy vehicle according to the present invention travels on the track the free ends of the wheel shafts of the vehicle are disposed in the grooves provided on both sides of the track sections and extend above the track sections. Therefore, even when the vehicle runs on an inverted portion of the track where it assumes an inverted position, the vehicle never falls off the track. The motor-dirven shafts of the wheels of the vehicle member and the coupled track sections are arranged so that the vehicle is driven with the toothed wheels on the shafts in mesh with the teeth of the rails. Owing to this arrangement, therefore, even when the vehicle is located on the portion of the track which extends vertically either straight or curving, the vehicle never slips nor moves backward on the rails.

The track assembly includes two turntables for reversing the vehicle. Each of these turntables not only can be coupled to one end of any one of the individual track sections so that the turntables may be used for reversing the position of the vehicle at each terminal of track, but also can be coupled at a desired intermediate section of the continuous track or at any other desired section so that the turntables may serve as the "railway switch unit." Each of the turntables is provided with a rotating disk which is rotated by the driving force of the vehicle when the latter rides on the turntable, whereby the position of the movable vehicle member riding on the turntable can be altered.

Other objects, features and attendant advantages of the present invention will become apparent by reading the following detailed description and the appended claims in conjunction with the accompanying drawing.

In the drawing, FIG. 1 is a perspective view of one embodiment of the present invention;

FIG. 3 is a side elevational view of one example of vehicle which is shown in engagement with the teeth of a rack rail provided on the track;

Figure 2:
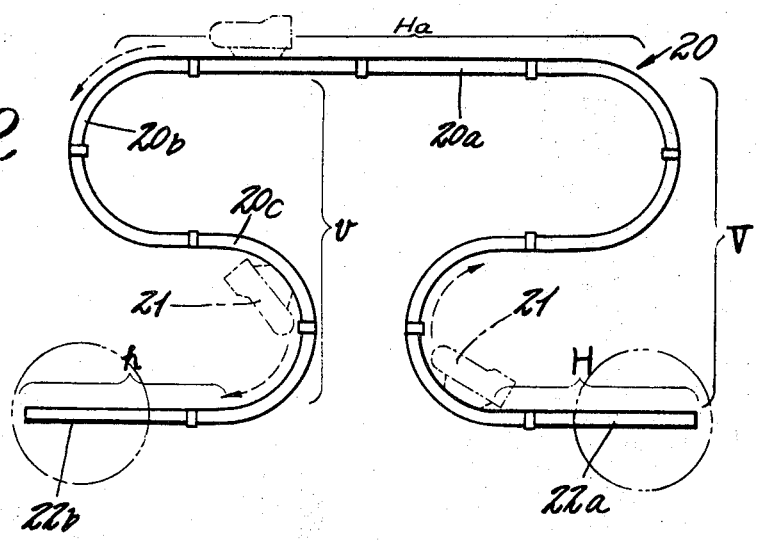
FIG. 2 is a diagrammatic side elevation, showing the layout of the track for use in the embodiment of FIG. 1.

The toy assembly which is illustrated in the accompanying drawing represents only one of the many examples of the present invention, particularly as far as the layout of the track constituting a part of the present invention is concerned. It should be understood by those skilled in the art that various modifications and variations of the cubic bridge-form track are possible and also that the vehicle, as illustrated, represents only one of the many examples of the present invention, particularly as far as its shape is concerned.

As is best seen in FIG. 1, the completed track assembly 20 provides a cubic bridge-form structure extending and rising from a horizontal surface such as a floor or the like, into the space above the floor. This bridge-form structure is constructed by connecting a number of individual track sections together. Rotary members or turntables 22a and 22b for reversing the vehicle 21 are connected to the ends of the track. These two rotary members provide the base pedestals of the cubic bridge-form structure 20.

The completed track assembly 20 of the cubic bridge-form structure comprises a plurality of straight track sections 20a, outwardly and vertically curved track sections 20b, inwardly and vertically curved track sections 20c and the rotary members or turntables 22a and 22b. Each of these sections has a channel-shaped cross section and each track section has connecting means at each of its ends and the rotary members have these at one end so that a layout of the track in a desired shape and can be produced by connecting a desired member of track sections.

The layout of the track having a cubic bridge-form structure such as is shown in FIG. 1 comprises, as is illustrated diagrammatically in FIG. 2, horizontal sections H and h which include two terminals consisting of two turntables 22a and 22b, vertical sections V and v which are of a vertically extending curved shape, and a horizontal section Ha which bridges between the upper ends of the vertically curved sections above the support surface for the structure. The vehicle 21 which is set on the track in an engaged relationship therewith travels backwardly and forwardly on the cubic bridge-form structure 20 of the track, over both the vertical and the horizontal sections. It is to be noted that the term "vertical" or "vertically" as used herein does not mean a line which is vertical and straight in its strict sense, but implies not only a vertical straight line, as a matter of course, but an upwardly directed line which may be an inwardly and vertically (upwardly) curved line and an outwardly and vertically (upwardly) curved line as is best seen in the diagrammatical illustration of FIG. 2, and the term is used in contrast to the horizontal line which is used to explain the position of the sections of the track extending substantially parallel with the horizontal plane of the surface on which the assembly as a whole is placed by means of the base pedestals formed by the terminals.

The vehicle member 21 is driven by a small motor which is powered, for example, by a dry battery. This vehicle member 21 may have a shape of, for example, a toy rocket as is illustrated in FIGS. 1 and 3.

As is explicity shown in FIG. 3, the vehicle member 21 comprises a vehicle body 21a and a pair of spaced parallel wheel shafts 23 and 24 located at both forward and rearward positions on the vehicle body. A toothed wheel 25 and a wheel 26 are provided near each free end of the wheel shafts. At least one of the two wheel shafts 23 is driven by an electric motor or like means positioned within the vehicle body 21a which is actuated by a switch means 27.

Figure 4:
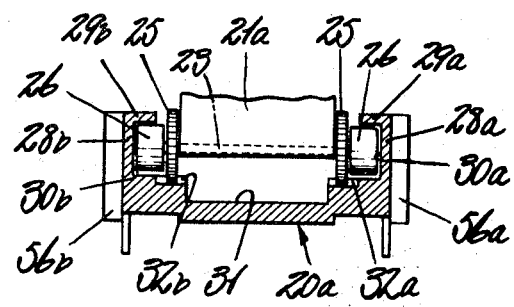
FIG. 4 is a sectional view showing the engagement of the wheel shafts system of the vehicle and the rails.

As will be understood by carefully referring to FIG. 4, all of the track sections have substantially channel shaped cross sections. For conveniences in the description of the track sections only a section 20a is described. As is best seen in FIG. 4, this track section 20a is provided with flange portions 28a and 28b each extending vertically on one side of the section. The upper ends 29a and 29b of the flange portions are bent inwardly toward each other for a small distance in a symmetrical shape to provide a pair of opposing grooves 30a and 30b extending along the section in the flange portions. On both sides of the upper face of the bottom portions 31 of the track section are provided a pair of parallel rows 32a and 32b of teeth which also extend along the section.

The rows 32a and 32b of teeth form a rack. These rows of teeth mesh with the teeth on the toothed wheels 25 which are mounted on either of the wheel shafts 24 and 24 of the vehicle 21. The guide wheels 26 are loosely mounted on the opposite ends of the wheel shafts for engaging in the bilateral grooves 30a and 30b as illustrated in FIGS. 3 and 4.

Since the wheel shafts of the vehicle member 21 are engaged within the grooves 30a and 30b by means of the guide wheels 26, the vehicle does not fall off the track. In addition, because the toothed wheels 25 and 25 on the wheel shafts are meshed with the teeth 32a and 32b on the rails, the vehicle can easily climb the vertical sections of the track.

Figure 5:
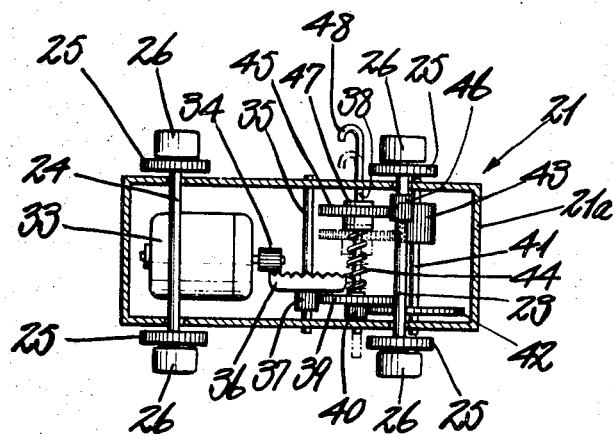
FIG. 5 is a bottom view of the vehicle showing an example of the driving mechanism provided inside the vehicle member.

FIG. 5 shows an example of the drving mechanism for use with the vehicle 21. The driving mechanism is arranged so that only the forward wheel shaft 23 is driven from an electric motor 33 and the number of revolutions is reduced when the rotation force is transmitted to the wheel shaft 23.

The motor 33 is powered by a dry battery housed within the body 21a of the vehicle. The teeth of a pinion 34 of the motor mesh with the teeth located on a crown gear 36 of a speed reducing shaft 35, while the teeth of a pinion 37 which is coaxial with the crown gear mesh with the teeth of a toothed wheel 39 which is mounted on a clutch shaft 38. The teeth of a pinion 40 formed integrally with the toothed wheel 39 mesh with the teeth of a toothed wheel 42 mounted on an intermediate shaft 41.

A pinion 43 having an extended length is fixed on the intermediate shaft 41 near its end on the side opposite to the location of the toothed wheel 42. A toothed wheel 45 is mounted so that it can slide on a clutch shaft 38 with a coil spring 44 interposed between the toothed wheel 45 and the toothed wheel 39. The teeth of the toothed wheel 45 mesh with the teeth of the pinion 43. The teeth of toothed wheel 45 also mesh with the teeth of a pinion 46 on the wheel shaft 23.

A flange 47 is provided on the clutch shaft 38 on the opposite end of the wheel 45 from the spring 44, so that the outgoing movement of the toothed wheel 45 which is urged in the outward direction by the coil spring 44 is restricted by the flange 47. One free end portion of the clutch shaft 38 protrudes outside the body 21a of the vehicle 21 to provide a handle 48. By pushing this handle 48 inwardly toward the body the vehicle against the resisting force of the spring 44, a distance which is indicated by the phantom lines in FIG. 5, the toothed wheel 45 is released from its engagement with the pinion 46 on the wheel shaft 23 with the result that the transmission of the driving force of the motor to the wheel shaft is cut off. However, the toothed wheel 45 always remains in engagement with the pinion 43 on the intermediate shaft 41.

By operating the handle 48 on the clutch shaft 38 as described above, it is possible either to cut off or transmit the driving force of the motor 33 to the wheel shaft of the vehicle and in this way "clutch action" is effected. This clutch action is equally useful to move the vehicle by gripping the vehicle with one's fingers, that is, not using the motor drive when the vehicle member is engaged with the grooves 30a and 30b of the track 20a and also with the rack teeth 32a and 32b of the rails, and also when the speed-reducing gear system is in meshed-engagement with the wheel shaft 23, the operator can accomplish this purpose quite easily by pushing the handle to release the engagement of the clutch to permit the vehicle to be moved manually.

Figure 6:
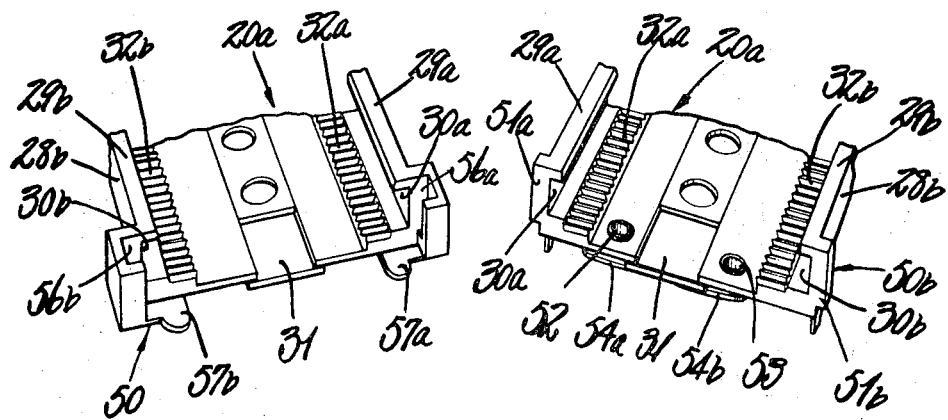
FIG. 6 shows perspective representations of the end portions of a couple of track sections to explain the connecting means which are formed on each of the end portions, of the sections.
Figure 7:
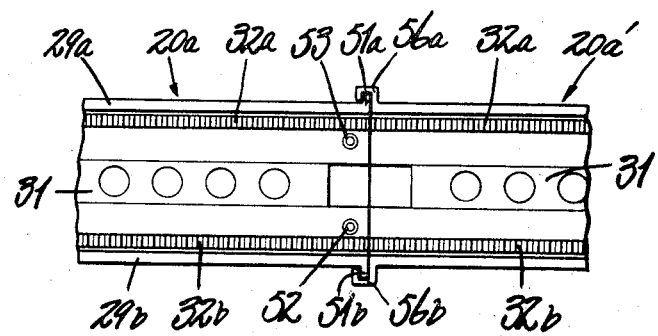
FIG. 7 is a plan view showing the connected portions of two track sections which are coupled together by the connecting means shown in FIG. 6.
Figure 8:
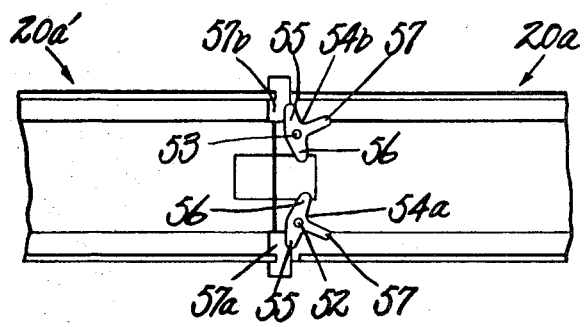
FIG. 8 is a bottom view showing the connected portions of FIG. 7.

FIGS. 6 through 8 show the details of the connecting means for joining the track sections together. Irrespective of whether the sections are straight vertically and outwardly curved, or vertically and inwardly curved, each of these sections is provided with both male and female connector elements formed at the opposite ends, respectively, of the track sections as shown in FIG. 6. For this reason, description of the connecting means of the track sections will be limited to the structure provided on the track sections 20a.

At one end of the track section 20a, there is provided a female or receiving connector member 50 of a shape as shown in the illustration on the left side of FIG. 6. At the opposite end of the section, there is provided a male or insertion connector member 50b of the type as shown in the illustration on the right side of the same figure. All of the track sections are coupled together by the use of these male and female connector members for forming a continuous track as shown in FIGS. 7 and 8.

The insertion connector member 50b at one end of the track section 20a includes a pair of protruding ridges 51a and 51b which extend outwardly from the ends of the bilateral walls of the section. A pair of locking fittings 54a and 54b are pivotally attached, such as by grommets having flanges at opposite ends thereof or by other appropriate means, specifically as illustrated by pins 52 and 53, to the lower face of the bottom wall 31 of the end portion of the track section 20a.

Each of the locking fittings 54a and 54b is a substantially T-shaped member and is provided with a first wing 55 and a second wing 56 and also with a third member which is a leg 57.

At the other end of the track section 20a which has receiving connector member 50 a pair of receiving recesses 56a and 56b are provided in the form of vertically extending grooves, respectively, each defined by a wall projecting outwardly from the end of the side wall of the section. These receiving recesses are provided with bottom walls, respectively, and are shaped so that when the protruding ridges 51a and 51b of connector member 50b are inserted into the recesses 56a and 56b from thereabove, a tight fitting engagement is established. A pair of lugs 57a and 57b is provided on the lower face of the bottom wall on the side of the female connector member 50 so that these lugs extend inwardly and in the longitudinal direction from the edge of the bottom face of the track section 20a.

If a pair thereof of track sections are to be connected, see FIGS. 7 and 8 first the male connector member 50b which has the protruding ridges 51a and 51b of one section 20a of the unit members is placed in register with the female connector member 50 which has the receiving recesses 56a and 56b of the other section 20a', and then the protruding ridges 51a and 51b are inserted into the corresponding receiving recesses 56a and 56b of the female connector member 50. When the bottom end 31 of the male connector member 50b rest on the lugs 57a and 57b of the female connector member 50, the locking fittings 54a and 54b are rotated so that the lubs 57a and 57b are nipped between the wings 55 and 56 of the locking fittings and the bottom wall of the male connector member 50b shown in FIG. 7. As a result, the track section 20a is successfully and securely connected to the track section 20a'.

Figure 9:
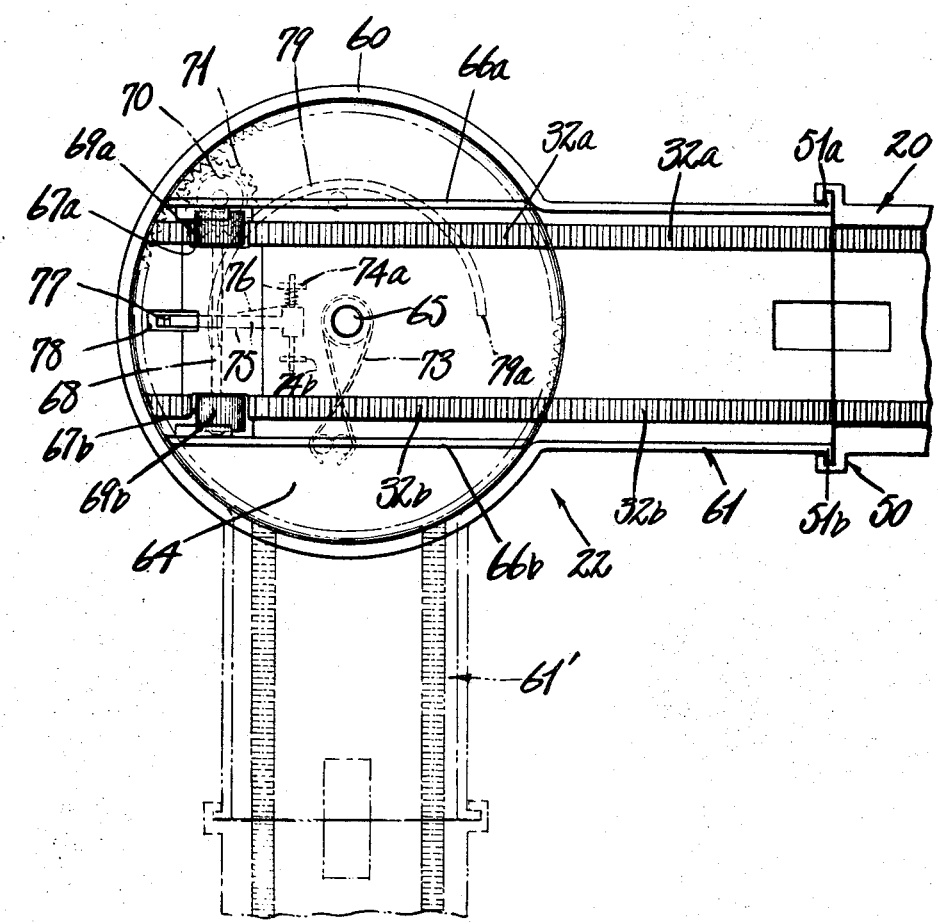
FIG. 9 is a plan view of a turntable in its normal position.
Figure 10:
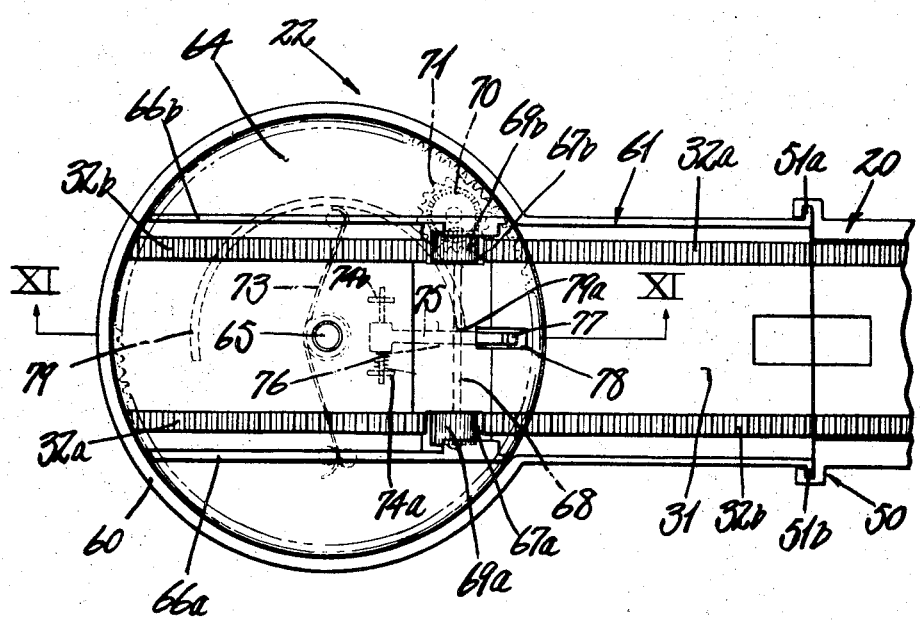
FIG. 10 is a plan view of the same turntable when it has made a revolution through 180 degrees.
Figure 11:
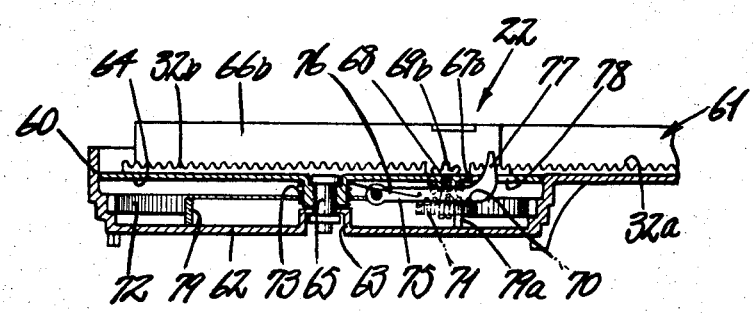
FIG. 11 is a sectional view taken along the line XI—XI in FIG. 10.

FIGS. 9 to 11 show the details of a rotary member or turntable which is adapted to be connected to a terminal of the coupled track assembly. This rotary member 22 comprises a circular base pedestal 60 and a connector arm 61 which extends in the direction of the radius of the circular base plate. This connector arm 61 is provided, in a similar fashion as with the other track sections 20, with a pair of rows 32a and 32b of rack rails, at one end of which is formed a male connector member comprising a pair of protruding ridges 51a and 51b having the same shape as described in connection with the embodiment shown in FIG. 6 so that these protruding ridges are inserted into a pair of receiving recesses which are formed in the connector member 50 of each of the track systems 20. This rotary member 22, however, is not provided with the formation corresponding to the longitudinally extending bilateral grooves 30a and 30b which are provided on the railway unit members 20, and therefore, this rotary unit member 22 is of a structure which is different in certain aspects and which may be termed as having an open structure.

The circular base pedestal 60 consists of a substantially cylindrical body which is small in height. This circular base pedestal 60 is constructed so that a disk 64, which serves as a turntable, is rotatably attached by a pin 65 to a bottom plate 62 of the base pedestal through a bearing 63 which is formed in the center of the bottom plate 62 (refer to FIG. 11).

On the upper face of the disk 64 is formed a pair of rows 32a and 32b of rack teeth arranged to be aligned with the rows 32a and 32b of rack teeth of the track section 20 and also to those of the arm member 61. Bilateral walls 66a and 66b are formed on the disk 64 so that both the rows of rack teeth and the walls extend in parallel relationship relative to each other and also with respect also to a diameter of the disk 64. Thus, the turntable is of a structure such that the vehicle 21 which travels on the toothed rails formed thereon is permitted to enter, in continuous sequence of movement, into the pedestal section and to ride on disk 64.

Cut-outs 67a and 67b or openings are formed at appropriate sites, close to the periphery of the disk 64, through the rows 32a and 32b of the rack teeth. Within the cut-outs 67a and 67b, there are disposed toothed wheels 69a and 69b, one in each cut-out, which are fixed, below the lower face of the disk 64, to a shaft 68 which is supported in such a way that these toothed wheels intersect the rows 32a and 32b of rack teeth at right angles, respectively. The toothed wheels 69a and 69b are arranged so that the teeth located on the upper sector of these toothed wheels substantially fill the open spaces of these cut-outs formed in the rows 32a and 32b of rack teeth and, as a result, form substantially continuous rows of teeth.

Below the lower face of the disk 64, a planetary gear 71 having a crown gear 70 is mounted on a shaft. The teeth of crown gear 70 mesh with the teeth of at least one of the two toothed wheels 69a and 69b. On the other hand, the teeth of the planetary gear 71 which are integral with the teeth of the crown gear 70 mesh with the teeth of an internal gear 72 which is of an annular shape and is formed on the inner periphery of the base pedestal 60. Whereby, when the toothed wheel 69b is driven, either the crown gear 70 and the planetary gear 71 moves while rotating, along the circle of a row of teeth of the stationary internal gear 72. Accordingly, the disk 64 rotates against the action of a spring 73, through a predetermined angle.

Moreover, a hook lever 75 is pivotally supported by means of a pair of brackets 74a and 74b beneath the lower face of the disk 64. This hook lever has a hook member 77 located at its outer end and this hook lever is normally urged upwardly by means of a spring 76. Hook member 77 protrudes upwardly beyond the upper face of said disk 64 through an aperture 78 in the disk, in the end portion of the track formed on the disk 64. The hook lever 75 is supported by a semi-circular guide wall 79 which is provided on the bottom plate 62 of the base pedestal 60, and the hook lever 75 is arranged so that normally it is not allowed to drop below the turntable.

Owing to the aforesaid arrangement of the rotary unit member, the movable vehicle member 21 which enters in to the base pedestal section and rides on the disk 64 of the rotary member 22 is able to alter its position by its own driving force. Therefore, not only is the vehicle able to alter its position through, for example, 180 degrees and to afford reciprocating travel between the terminals but it also can easily change its position through 90 degrees or through any other desired angle within 180 degrees for alignment with another track connected thereto in a different direction.

As is indicated by a phantom line in FIG. 9 by way of example, it is possible for the vehicle to ride onto a track 61' which is connected in a different direction which crosses the track of the arm member 61 at right angles.

Description will next be directed to the general procedure of operation of the toy assembly of the present invention. The vehicle member 21 is of the type that can be manually controlled by the actuation of its motor, which is housed therein, by manipulating the switch lever 27 (refer to FIG. 3). This vehicle member 21 is mounted from above onto the toothed rack rails 32a and 32b, of the arm member 61 of the rotary member 22 because it is an open structure.

It is to be understood that the rotary members are usually placed on a horizontal flat surface such as a floor. Therefore, in case it is intended to assemble the track-constituting members into the form, for example, of an assembly as is illustrated in FIG. 1, consideration should be given the rotary members as the base legs for the assembled track for assembling bridge-form structure in a stabilized condition.

When the vehicle 21 arrives on the disk 64 of the rotary member 22 which, for example, is in FIG. 9, the body 21a of the movable vehicle member is engaged and locked by the hook member 77 when the vehicle member is in its position such that the teeth of the toothed wheels 25 are in meshed engagement with the teeth of the toothed wheels 69a and 69b. This engagement between these toothed wheels permits the toothed wheel 69a or the planetary gear 71 to be driven continuously while the vehicle member is retained in position. As a result, the disk 64 and the vehicle member which rests on the disk begin to turn. When these members 64 have completed a revolution through 180 degrees, the end edge 79a of the guide wall 79 no longer supporting the hook lever 75, and as a consequence, the free end 77 of the hook lever drops downwardly against the resisting action of the spring 76, and the hook member 77 is released from its engagement with the vehicle 21. Whereupon, the vehicle 21 is allowed to leave the rotary member 22 to again proceed back to the other terminal. Then, upon its arrival on the rotary member 22b on the other terminal at the opposite end of the track, the vehicle is again reversed as described above, and a reciprocating travel of the vehicle is effected.

Since the vehicle member 21 is retained in place by the grooves 30a and 30b which are formed by both sides of the track, the vehicle 21 will never become disengaged from the track in any of its positions even when it assumes an inverted position, and the vehicle member can also travel continuously at the same speed on vertical and inverted sections as it runs on the horizontal sections.

What is claimed is:

1. A toy comprising a track system and a vehicle for traveling over said track system, said track system comprising a plurality of longitudinally extending track sections, means on each of said track sections for interconnecting said sections together, said track sections having varied configurations so that when interconnected a portion of said track system extends in an elevated bridge-like structure above the remainder of said track system, each said track section having a channel-shaped cross section transverse of the longitudinal direction and the channel-shaped cross section being formed of a longitudinally extending bottom portion and a pair of laterally spaced side walls, each said track section having a pair of longitudinally extending inwardly facing grooves, a pair of laterally spaced longitudinally extending parallel racks formed on said track sections, a motor mounted in said vehicle for supplying the power to propel said vehicle on said track sections, at least a pair of guide rollers mounted on said vehicle and extending into said grooves in said track sections for retaining said vehicle on said track system regardless of the orientation of the individual said track sections thereof, at least a pair of drive wheels on said vehicle operatively engaged with said motor and in meshed engagement with said racks on said track section for moving said vehicle over said track system, a turn table positioned at each end of said track system, said turn table comprising a stationary base, a disc rotatably mounted on said base, track means formed on said disc for receiving said vehicle on said turntable from said track system, and means in said turn table arranged for operative engagement with said drive wheels on said vehicle for rotating said disc and reversing the direction of said vehicle for returning it onto said track system for travel to the opposite end thereof.

2. A toy, as set forth in claim 1, wherein at least some of said track sections having a rectilinear axis in the longitudinal direction and at least some other of said track sections having a curved axis in the longitudinal direction with the track sections having said curved axes being disposed in a curved plane whereby when said track sections are interconnected some of said track sections extend vertically upwardly above base track sections having the rectilinear axes and are connected thereabove to other said track section having rectilinear axis to form a bridge-like structure elevated above said base track sections.

3. A toy, as set forth in claim 2, wherein said side walls extend longitudinally along said base portion and one of said longitudinally extending grooves is formed in each of said side walls facing toward the other said side wall, said parallel racks being formed on the bottom portion of said track sections spaced inwardly from said side walls, and said means for interconnecting said track sections comprising a male connector element at one end of each said track section and a female connector element at the opposite end of each said track section so that any two track sections can be joined together to form a desired track system.

4. A toy, as set forth in claim 1, wherein said vehicle comprises a vehicle body, a pair of longitudinally spaced parallel wheel shafts supported in said vehicle body, a driving mechanism housed within said vehicle body and in operative engagement with said motor for driving at least one of said wheel shafts, at least one of said wheel shafts having a pair of gear wheels thereon spaced apart to mesh with said racks on said track sections, and at least one of said wheel shafts having said guide rollers mounted on the outer ends thereof for engagement within said grooves in said track sections for holding said vehicle on said track section.

5. A toy, as set forth in claim 4, wherein said drive mechanism comprises a transmission comprising a train of gear wheels and a manually operated clutch, said clutch comprising a shaft and one of said gear wheels of said train of said gear wheels being mounted on said shaft, means for resiliently biasing said shaft so that it is axially displaceable against the resilient bias, and said gear wheel on said shaft being disengageable from said gear train whereby on the release of the disengaging force the resiliently biasing means positions said gear wheel in operative engagement in said gear train.

6. A toy, as set forth in claim 1, wherein said base of said turn table comprises a circular gear ring, said disc having apertures therein formed in the line of said racks thereon, a plurality of gear wheels mounted on the lower surface of said rotating disc and comprising a pair of first gear wheels arranged to extend through the apertures in said rotating disc in alignment with said racks thereon so that said drive wheels on said vehicle can mesh with said first gear wheels when said vehicle is positioned on said rotary disc, at least one second gear wheel in the form of a crown gear in meshed engagement with one of said first gear wheels, and a third planetary gear wheel formed integrally with said second crown gear wheel and being in meshed engagement with said gear ring on said base, whereby when a vehicle is positioned on said turn table and its drive wheels engage said first gear wheels of said turn table the rotation imparted thereto is transmitted to said third planetary gear wheel for rotating said disc relative to said base for reversing the position of said vehicle for return to said track section.

7. A toy, as set forth in claim 6, wherein said disc having an aperture therein spaced between said racks thereon, a catch lever pivotally mounted on the underside of said rotating disc, means for biasing said catch lever through the aperture in said disc positioned between said racks so that said catch lever engages said vehicle when it is positioned on said disc and holds said vehicle thereon as said disc is rotated and said means arranged to release said catch lever when the reversing action of said turn table is complete for returning said vehicle onto said track system.

8. A toy comprising a track system and a vehicle for traveling over said track system, said track system comprising a plurality of longitudinally extending interconnected track sections and at least some of said track sections being in a curved plane in the longitudinal direction for forming an elevated bridge-like structure, each of said track sections comprising means forming a pair of inwardly facing oppositely disposed guide grooves engaging members on said vehicle for laterally extending into said guide grooves for retaining said vehicle on said track system, a pair of laterally spaced parallel racks formed on each of said track sections inwardly from said guide grooves, motor driven gear wheels mounted in said vehicle for engagement with said racks on said track sections for propelling said vehicle along said track system, and a turn table being positioned at each of the ends of said track system, said turn table comprising a base, a disc rotatably mounted on said base, a track section member secured to and extending laterally from said base and arranged for alignment and interconnection with said track system, a gear ring formed in said base below said disc, said disc and said track section member having racks thereon arranged to align with the racks in said track system, said disc having apertures therein in the line of said racks, and a second aperture spaced between said racks, a plurality of gear wheels supported on the underside of said disc and comprising a pair of first gear wheels arranged in alignment with the apertures in said racks on said disc to extend through said apertures and to mesh with said drive wheels of said vehicle when said vehicle is positioned on said disc, a second gear wheel in the form of a crown gear in meshed engagement with one of said first gear wheels, and a third gear wheel in the form of a planetary gear integral with said second gear wheel and in meshed engagement with said gear ring on said base, so that as said first gear wheels are driven by said driven wheels on said vehicle said third gear wheel in engagement with said gear ring on said base rotates said disc relative to said base, and resilient means on said turn table for returning said disc to its original position after it has been rotated by said gear wheels on said rotating disc.

9. A toy, as set forth in claim 8, wherein said vehicle comprises a driving mechanism, said driving mechanism comprising a train of gear wheels and a manually operated clutch, said clutch comprising a shaft having one of said gear wheels of said train of gear wheels mounted thereon, said shaft being supported in said vehicle, means for resiliently biasing said shaft for displacing said gear wheel thereon out of engagement with said train of gear wheels and when the displacing force on said shaft is released said resilient biasing means re-engages said gear wheel on said shaft with said train of gear wheels.

10. A toy, as set forth in claim 8, wherein a pair of longitudinally spaced laterally extending wheel shafts mounted in said vehicle, a pair of gear wheels mounted on each of said shafts inwardly from the outer ends thereof and spaced apart for engagement with said racks on said track sections, a battery operated motor positioned within said vehicle, said driving mechanism including a reduction gear being operatively engaged with said motor and in meshed engagement with one of said shafts for rotating said shaft and driving one pair of said gear wheels.

11. A toy, as set forth in claim 8, wherein a catch lever pivotally mounted on the underside of said disc and having a projection on its free end arranged to extend through the aperture in said disc located between said racks thereon, means for resiliently biasing said catch lever in a raised position extending through the aperture in said disc for engaging said vehicle when it is positioned on said disc, a support for said catch lever to maintain it in a raised position as said disc is rotated, said support being arranged to release said catch lever when the rotation of said disc is completed so that said catch lever drops downwardly through said aperture to the underside of said disc for releasing said vehicle and said resilient biasing means arranged to raise said catch lever after said vehicle is released.

References Cited
UNITED STATES PATENTS

| | | | |
|---|---|---|---|
| 1,336,362 | 4/1920 | McClure et al. | 104—35 X |
| 2,782,730 | 2/1957 | Frank | 46—216 X |
| 3,337,985 | 8/1967 | Ryan et al. | 46—243 |

ROBERT PESHOCK, Primary Examiner

R. F. CUTTING, Assistant Examiner

U.S. Cl. X.R.

46—216; 104—89, 91; 105—35